US010210054B1

(12) United States Patent
Mehrotra et al.

(10) Patent No.: US 10,210,054 B1
(45) Date of Patent: *Feb. 19, 2019

(54) BACKUP OPTIMIZATION IN HYBRID STORAGE ENVIRONMENT

(71) Applicant: International Business Machines Corporation, Armonk, NY (US)

(72) Inventors: Gaurav Mehrotra, Pune (IN); Nishant Sinha, Pune (IN); Pratik P. Paingankar, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/890,384

(22) Filed: Feb. 7, 2018

Related U.S. Application Data

(63) Continuation of application No. 15/691,823, filed on Aug. 31, 2017.

(51) Int. Cl.
*G06F 11/14* (2006.01)
*G06F 17/30* (2006.01)

(52) U.S. Cl.
CPC .... *G06F 11/1469* (2013.01); *G06F 17/30339* (2013.01); *G06F 2201/80* (2013.01); *G06F 2201/805* (2013.01); *G06F 2201/82* (2013.01)

(58) Field of Classification Search
CPC ........... G06F 11/1469; G06F 17/30339; G06F 2201/80; G06F 2201/805
USPC ....................................................... 714/6.3
See application file for complete search history.

(56) References Cited

U.S. PATENT DOCUMENTS

| 6,154,817 | A | 11/2000 | Mohan et al. |
| 6,748,494 | B1* | 6/2004 | Yashiro ................. G06F 12/127 711/133 |
| 7,100,007 | B2* | 8/2006 | Saika .................. G06F 11/1451 709/218 |
| 7,581,061 | B2* | 8/2009 | Miyagaki .............. G06F 3/0613 711/114 |
| 8,935,366 | B2 | 1/2015 | Mehr et al. |
| 9,317,373 | B2 | 4/2016 | Han et al. |
| 2006/0069861 | A1* | 3/2006 | Amano ............... G06F 11/1458 711/114 |
| 2012/0054248 | A1* | 3/2012 | Mehrotra .......... G06F 17/30557 707/803 |

(Continued)

OTHER PUBLICATIONS

Mell et al., "The NIST Definition of Cloud Computing", Recommendations of the National Institute of Standards and Technology, Sep. 2011, U.S. Department of Commerce, 7 pages.

(Continued)

*Primary Examiner* — Joseph R Kudirka
*Assistant Examiner* — Indranil Chowdhury
(74) *Attorney, Agent, or Firm* — Nathan M. Rau

(57) ABSTRACT

A means for assigning database objects to a backup storage group proceeds by collecting information related to a plurality of backup devices. The information collected includes speed of recovery, time to backup, and a recovery rank for each device. A backup pool is defined, using a database configuration parameter, to contain one or more of the plurality of backup devices. A determination is made to store a backup of a data object in a first device of the plurality of backup devices based on the collected information and a priority rank associated with the data object.

1 Claim, 7 Drawing Sheets

(56) References Cited

U.S. PATENT DOCUMENTS

| | | |
|---|---|---|
| 2015/0193312 A1 | 7/2015 | Nanivadekar et al. |
| 2015/0234719 A1* | 8/2015 | Coronado ............. G06F 11/203 714/6.3 |
| 2016/0085468 A1 | 3/2016 | Crescenti et al. |
| 2017/0005915 A1 | 1/2017 | Mirsky et al. |

OTHER PUBLICATIONS

Mehrotra et al., "Backup Optimization in Hybrid Storage Environment", U.S. Appl. No. 15/691,823, filed Aug. 31, 2017.
List of IBM Patents or Patent Applications Treated as Related, dated Feb. 2, 2018, pp. 1-2.

* cited by examiner

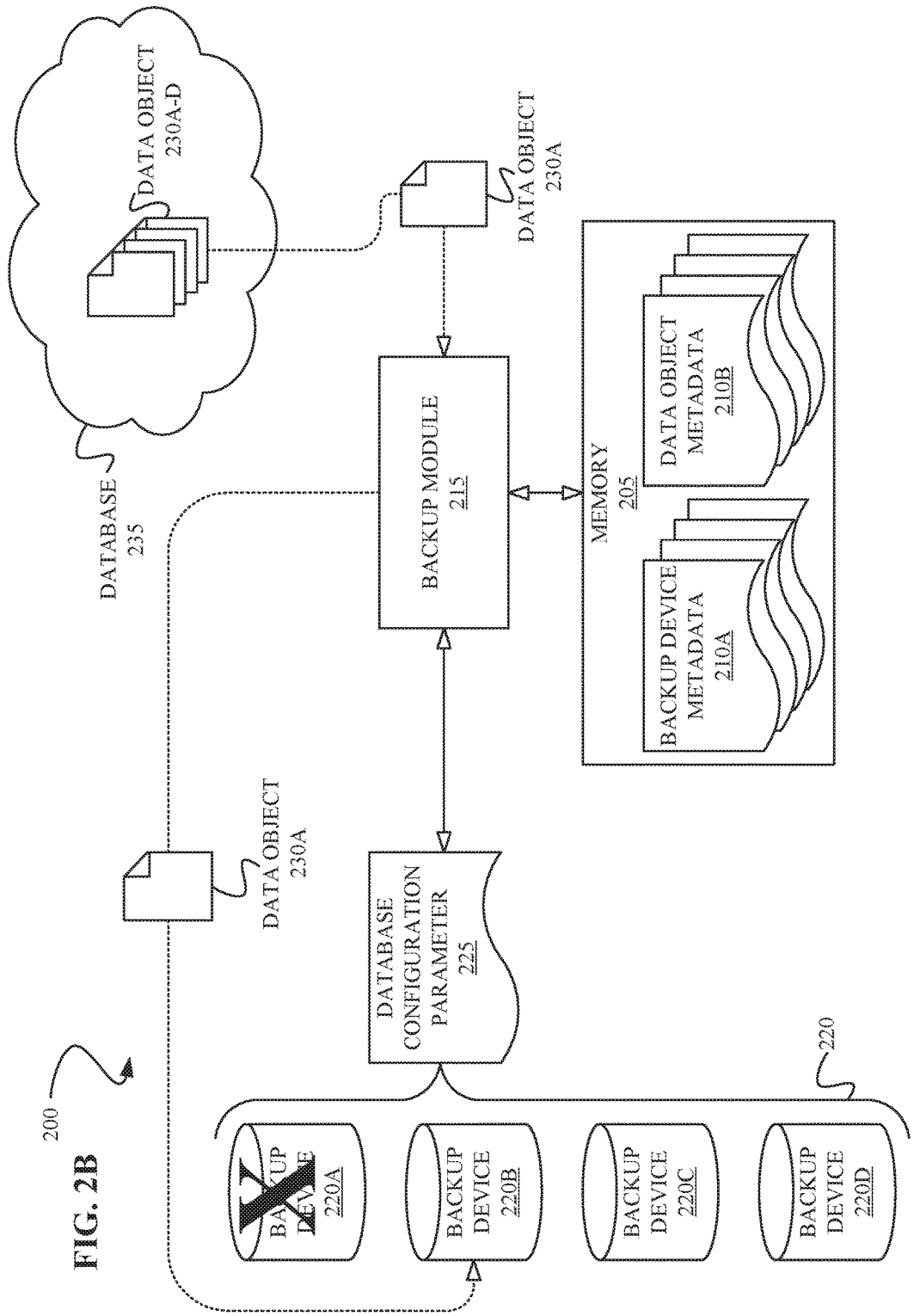

BACKUP OPTIMIZATION IN HYBRID STORAGE ENVIRONMENT

BACKGROUND

The present disclosure relates to optimizing a backup of a database, and more specifically, to optimizing backups in a hybrid storage environment.

In executing a backup, commonly a backup administrator is needed to ensure the infrastructure of a backup device or backup location is healthy and has adequate space. Existing backup strategies often require that the strategy and/or the media to take the backup is pre-defined.

SUMMARY

According to embodiments of the present disclosure, a method is described for assigning database objects to a backup storage group.

The method proceeds by collecting information related to a plurality of backup devices. The information collected may include each device's speed of recovery, time to backup, and an associated recovery rank. A backup pool is defined using a database configuration parameter. The backup pool contains one or more of the plurality of backup devices.

The method further proceeds by determining to store a backup of a data object in a first device of the plurality of backup devices based on the collected information and a priority rank associated with the data object.

A computing system and computer program product can embody the method and structures of the disclosure. The computing system can comprise a network, a memory configured to store backup device and data object metadata, and a backup module in communication with the memory. The computing system can be configured to perform the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 2B depicts an example system for optimizing database backups in a hybrid storage environment handling a failure, according to embodiments of the present disclosure.

Figure 1:
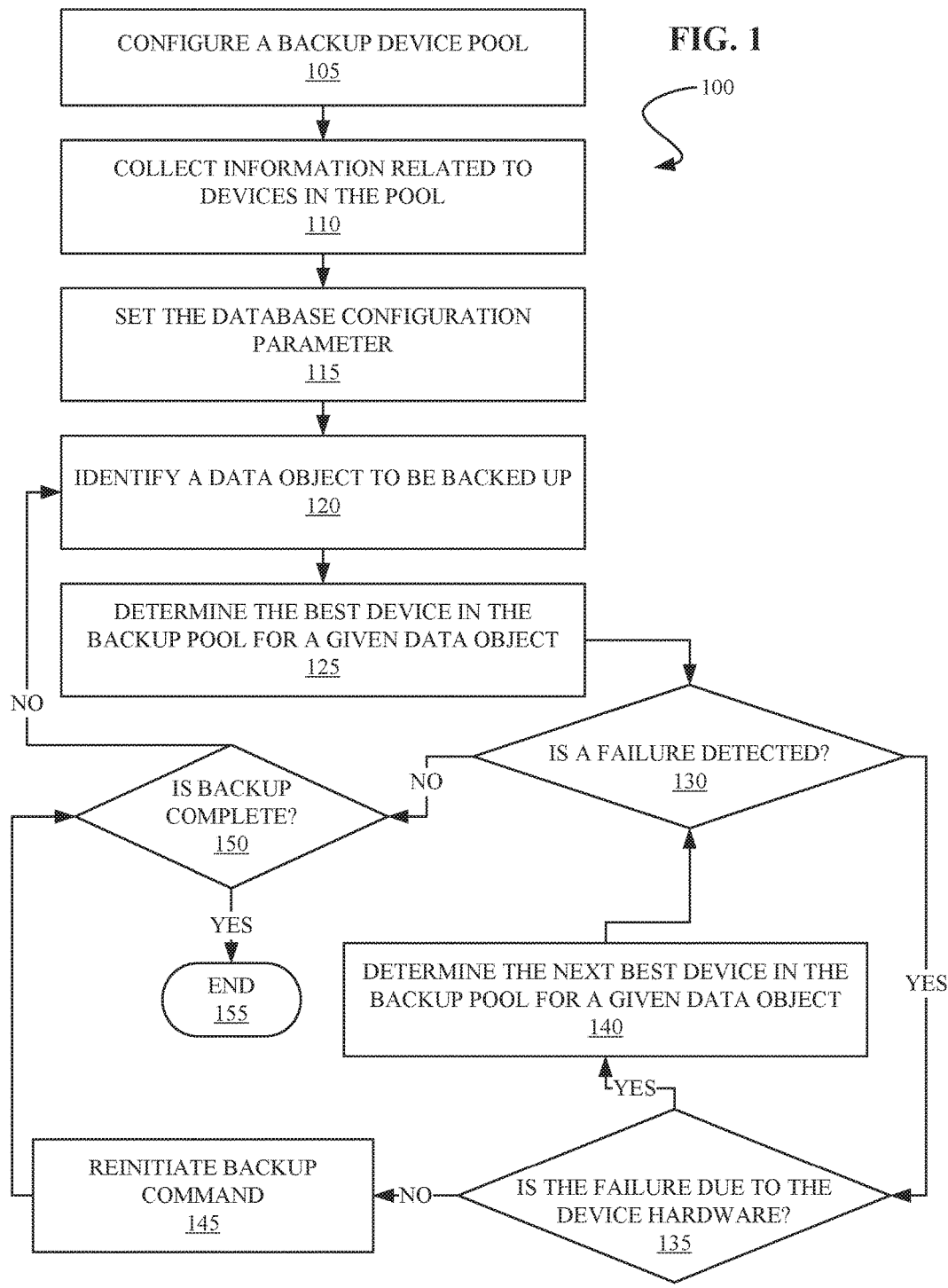
FIG. 1 depicts an example method for optimizing database backups in a hybrid storage environment, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to optimizing a backup of a database, and more particular aspects relate to optimizing backups in a hybrid storage environment. While the present disclosure is not necessarily limited to such applications, various aspects of the disclosure may be appreciated through a discussion of various examples using this context.

Existing database backup management systems have only a limited ability to handle and utilize storage environments with heterogeneous backup devices. In order to utilize such a hybrid storage environment, the backup administrator must pre-configure the database with the media of each of the heterogeneous devices used to take the backup. Further, if an issue with a particular media assigned to take a backup arises during the backup window the backup administrator must reconfigure the backup and reassign it to another media to permit a successful backup. In the case of a device failure, the entire backup may fail and cannot be reinitiated until the device is fixed and made available again to the database.

A method and system is described herein for taking a backup of a database using a hybrid storage environment. By configuring a backup device pool and using a separate parameter to define the pool at the database level, the details of the specific devices are hidden from the database and failure of a particular device in the pool will not affect the success of the backup. From the perspective of the database, any adjustments made to which device receives the backup is concealed and the database only sees that the backup is taken by the pool. Further, the method or system can maintain metadata such as: the time to take a backup, the media upon which a backup is taken, system utilization of each backup device, the space available in the pool and on individual devices, the health state of the pool and individual backup devices, etc. This metadata can be used to maximize effective usage of the disparate devices in the pool.

An access system catalog may be provided to rank and/or identify the rank of database objects and to place the data objects on a particular backup device in the pool according to their rank, e.g. high ranking objects essential for recovery may be backed up on a solid state drive (SSD) device and lower ranking objects stored on a serial AT attachment (SATA) or on a tape.

Described herein is a method for assigning database objects to a hybrid backup storage group. In embodiments, the method may proceed as the example method 100 depicted in FIG. 1.

The example method 100 may begin by configuring a backup device pool, as in operation 105. The backup device pool may generally contain a plurality of heterogeneous backup devices. Backup devices in the pool may include a Tivoli Storage Manager (TSM) device, drives (raw, flash, SATA, etc.), a disk pool, a virtual tape library (VTL), SSD, etc. The pool may be assembled, in embodiments, using a configuration file which comprises a list of the plurality of heterogeneous backup devices. The configuration file may be populated by running commands at the database level to add or remove devices. In embodiments, the commands to add or remove devices from the pool may execute before, after, or any point during the backup window.

Information related to the plurality of backup devices may be collected, as in operation 110. In embodiments, the information collected may include speed of recovery, time to backup, a recovery rank for each device, a media identifier (indicating a type of media associated with a given backup device), a resource indicator, etc. The information collected may be used to rank the plurality of heterogeneous backup devices in the pool. Devices may be ranked according to security, reliability, or some other criteria prioritized by a user. For example, the recovery rank for a particular device may be calculated based on the device's speed of recovery, media identifier, and resource indicator.

The backup device pool may be defined, at the database level, using a database configuration parameter, as in operation 115. By defining the backup device pool at the database level with the configuration parameter, the particular details regarding the plurality of devices in the pool may be hidden from the database. In this way, from the perspective of the database, the backup is simply taken by the pool and any changes to the backup configuration necessitated by, for example, a failure of a particular device in the pool, may be handled without the involvement of the database. In embodiments, the configuration parameter defining the pool may be modified to redefine the backup pool to add an additional backup device to the plurality of backup devices or to remove a backup device from the plurality of backup devices.

A data object in the database may be identified to be backed up using the backup device pool, as in operation 120. Once a data object to be backed up is identified, a particular device among the plurality of heterogeneous backup devices may be determined to be the best device to store a backup of the data object, as in operation 125. In embodiments, the particular backup device among the plurality of heterogeneous backup devices which is determined to be the best device to store the backup of the data object is selected according to the rank of the backup device, the device's rank determined according the information collected regarding the plurality of backup devices, and a priority rank associated with the data object. The priority rank associated with the data object may generally be determined according the data object's role, or lack of a role, in database recovery. In embodiments, the criteria for ranking the data objects may vary.

The method may at any point receive or seek indication of a failure of a device among the plurality of backup devices, as in decision block 130. The indication of failure may be transmitted by the device itself as the result of self-diagnostics, detected by an external monitoring system, or any other means of assessing a device's health state.

If a failure is detected in the first device selected to store the backup of the data object, the failure may be analyzed to identify a cause for the failure. In embodiments, the analysis may be received along with the indication of the device failure, or the analysis may be executed by the backup system. The analysis may involve an initial assessment determining whether or not the cause of the failure is due to the device hardware, as in decision block 135. If it is determined that the cause of the failure was due to the device hardware, then the next best device in the backup pool for storing a given data object may be determined, as in operation 140. Generally, the next best device in the pool for storing a given data object may be determined using the same criteria used when selecting the first choice device. Once the new device is selected, it may be reassessed for failure, as in decision block 130.

If instead the analysis at decision block 135 determines that the cause of the failure was not due to the device hardware of the selected device, then further analysis may be performed. Based on the cause identified, the backup command may be reinitiated, as in operation 145. Following re-initiation of the backup command, an assessment may be made of whether the backup is complete, as in decision block 150. If it is determined that it is complete, to method may end, as in operation 155. If the backup is not complete, e.g. the database indicates there are more data objects to be backed up, a new data object to backup may be identified as in operation 120.

If at decision block 130 no failure is detected, the method may proceed to determine if the backup is complete, as at decision block 150. If it is determined that it is complete, the method may end, as in operation 155. If the backup is not complete, e.g. the database indicates one or more data objects remain to be backed up, a new data object to backup may be identified as in operation 120.

Figure 2A:
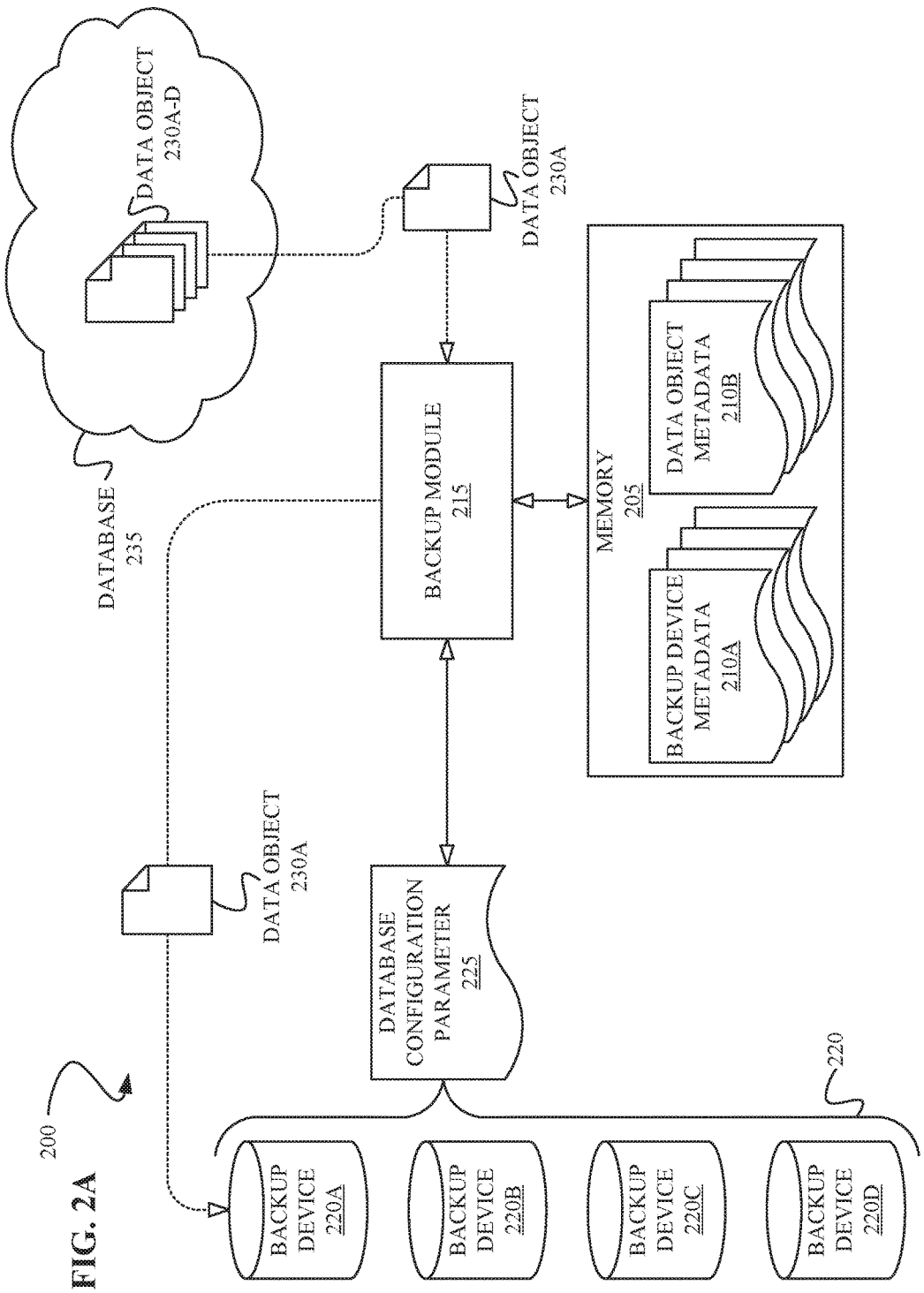
FIG. 2A depicts an example system for optimizing database backups in a hybrid storage environment, according to embodiments of the present disclosure.

Referring now to FIG. 2A, an example computer system 200 for assigning database objects to a backup storage group is depicted. In embodiments, the example system 200 may be a cloud system or configured on a network.

In embodiments, the system may include a memory 205. In embodiments, the memory may contain program instructions for performing a method similar to the example method 100 described above in relation to FIG. 1. The memory 205 may contain metadata useful for carrying out the method. Metadata stored in the memory 205 may include backup device metadata 210A for the backup devices in the pool and/or data object metadata 210B for data objects in the database to be backed up.

The program instructions in the memory 205 may generally be executable by a processor, such as the backup module 215 in the example system depicted in FIG. 2A. In embodiments, the backup module 215 may be in communication with the memory 205. The backup module 215 may be configured to enable the system 200 to perform the method as stored in the memory 205. The backup module 215 may itself be a processor, or it may contain multiple components which may include a processor.

The system 200 may further contain a pool 220 of heterogeneous backup devices 220A-D. Collected information related to the backup device 220A-D may be stored in the memory 205 as backup device metadata 210A. Backup device metadata 210A may include, for example, speed of recovery, time to backup, a recovery rank for each device, a media identifier, a resource indicator, etc. A recovery rank for each device 220A-D may be calculated based on components of the particular device's metadata. For example, in embodiments, a device's recovery rank may be calculated using the device's speed of recovery, media identifier, and resource indicator. The recovery rank may serve to order the backup devices 220A-D according to reliability, security, or some other user-selected criteria. The recovery rank may place backup devices determined to be best suited for more critical data objects at higher ranks than other backup devices determined to be less suited for critical data objects.

The backup device pool 220 may be defined by a database configuration parameter 225. In embodiments, the configuration parameter 225 may be communicated to the backup module 215, as in this example, or may be communicated directly to the database 235. In embodiments, the configuration parameter 225 may define the pool 220 at the database level, and be stored in the database 235. The backup module 215 may modify the configuration parameter 225 to add or subtract backup devices to/from the pool 220. In embodiments, the configuration parameter 225 may be defined and modified by the database 235 itself.

The system 200 may include or be in communication with a database 235, such as cloud database. In embodiments, the database may be a cloud database, as in example system 200, a remote or integral disk database, a distributed database, etc. The database 235 may store any number of data objects 230A-D. Each data object 230A-D may have associated data object metadata 210B. The data object metadata 210B may be stored in the memory 205, as in example system 200, or may be stored along with data object 230A-D in the database 235. The data object metadata 210B may include a priority rank for the particular data object 230, indicating, for example, the importance of the particular data object in the recovery process for the database.

The backup module 215 may receive or retrieve a data object 230A to be backed up. The backup module 215 may determine to store a backup of the data object 230A in a first backup device 220A based on the backup device metadata 210A and any relevant data object metadata 210B.

Referring now to FIG. 2B, example system 200 is depicted handling a hardware failure in one of the backup devices comprising the backup pool. In embodiments, the backup module 215 may detect a failure in the first backup device 220A and perform an analysis of the failure. In embodiments, the backup module 215 may receive indication and analysis of the failure from the first backup device 220A itself or an external monitoring system. The backup module may identify a hardware failure as the cause for the failure in the first device and in response identify a second backup device (e.g. backup device 220B) as the most suitable second choice to store the backup of the data object 230A based on the collected information and the priority rank associated with each of the backup device 220B and the data object 230A. The process for determining which device among the pool 220 would best serve as the second choice backup device may generally similar to the process for selecting the first choice backup device.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3A:
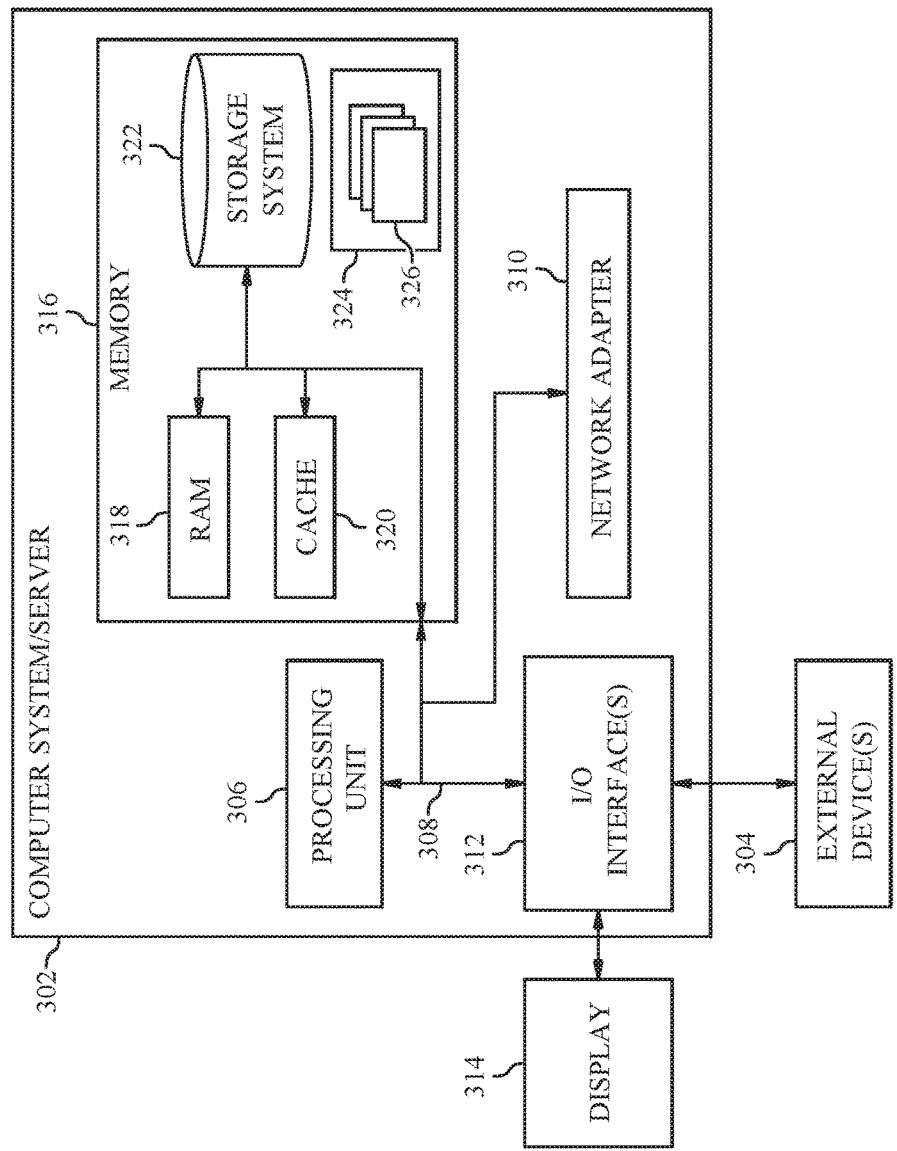
FIG. 3A depicts a cloud computing node according to an embodiment of the present invention.

Referring now to FIG. 3A, a schematic of an example of a cloud computing node is shown. Cloud computing node 300 is only one example of a suitable cloud computing node and is not intended to suggest any limitation as to the scope of use or functionality of embodiments of the invention described herein. Regardless, cloud computing node 300 is capable of being implemented and/or performing any of the functionality set forth hereinabove.

In cloud computing node 300 there is a computer system/server 302, which is operational with numerous other general purpose or special purpose computing system environments or configurations. Examples of well-known computing systems, environments, and/or configurations that may be suitable for use with computer system/server 302 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 302 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3A, computer system/server 302 in cloud computing node 300 is shown in the form of a general-purpose computing device. The components of computer system/server 302 may include, but are not limited to, one or more processors or processing units 306, a system memory 316, and a bus 308 that couples various system components including system memory 316 to processor 306.

Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 302 typically includes a variety of computer system readable media. Such media may be any available media that is accessible by computer system/server 302, and it includes both volatile and non-volatile media, removable and non-removable media.

System memory 316 can include computer system readable media in the form of volatile memory, such as random access memory (RAM) 318 and/or cache memory 320. Computer system/server 302 may further include other removable/non-removable, volatile/non-volatile computer system storage media. By way of example only, storage system 322 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, system memory 316 may include at least one program product having a set (e.g., at least one) of program modules that are configured to carry out the functions of embodiments of the invention.

Program/utility 324, having a set (at least one) of program modules 326, may be stored in system memory 316 by way of example, and not limitation, as well as an operating system, one or more application programs, other program modules, and program data. Each of the operating system, one or more application programs, other program modules, and program data or some combination thereof, may include an implementation of a networking environment. Program modules 326 generally carry out the functions and/or methodologies of embodiments of the invention as described herein.

Computer system/server 302 may also communicate with one or more external devices 304 such as a keyboard, a pointing device, a display 314, etc.; one or more devices that enable a user to interact with computer system/server 302; and/or any devices (e.g., network card, modem, etc.) that enable computer system/server 302 to communicate with one or more other computing devices. Such communication can occur via input/output (I/O) interfaces 312. Still yet, computer system/server 302 can communicate with one or more networks such as a local area network (LAN), a general wide area network (WAN), and/or a public network (e.g., the Internet) via network adapter 20. As depicted, network adapter 310 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

Figure 3B:
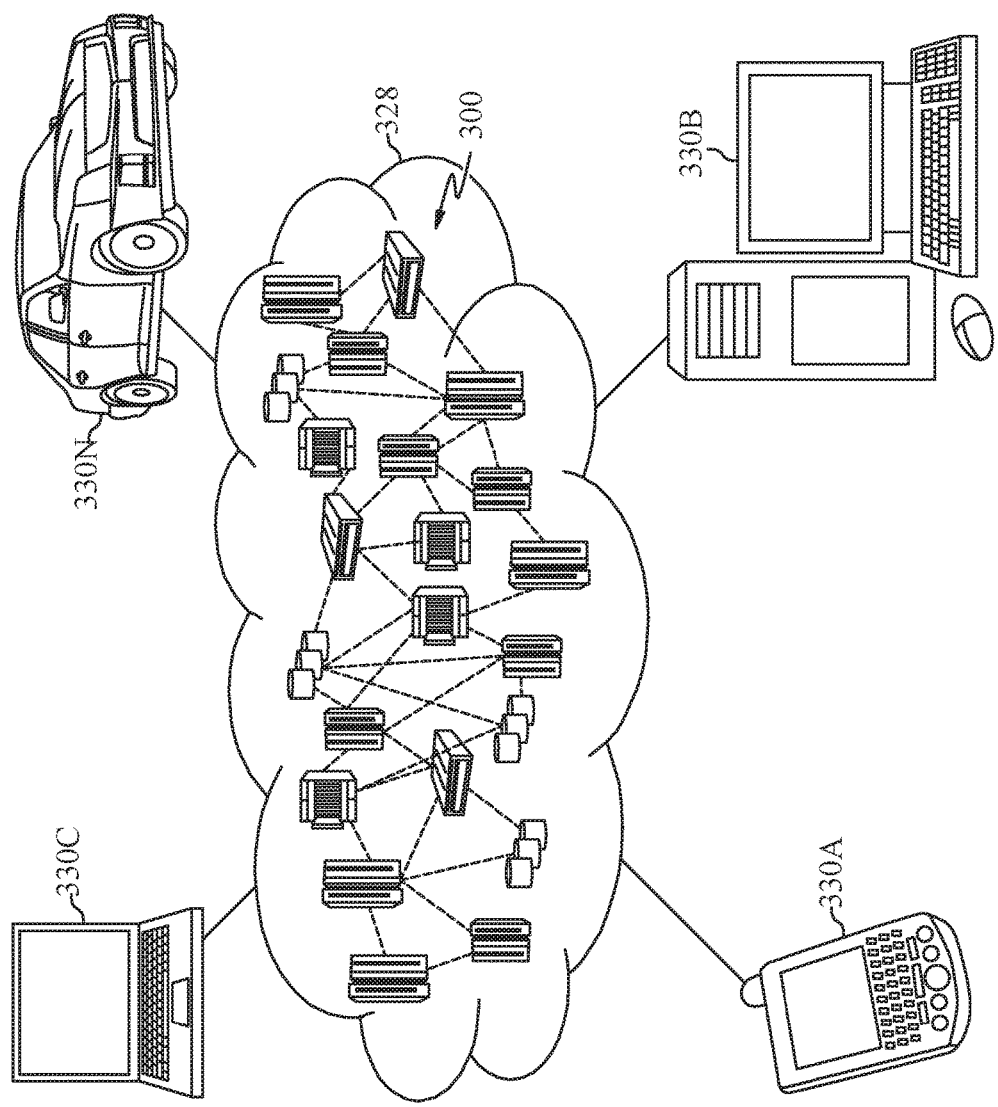
FIG. 3B depicts a cloud computing environment according to an embodiment of the present invention.

Referring now to FIG. 3B, illustrative cloud computing environment 328 is depicted. As shown, cloud computing environment 328 comprises one or more cloud computing nodes 300 with which local computing devices used by cloud consumers, such as, for example, personal digital assistant (PDA) or cellular telephone 330A, desktop computer 330B, laptop computer 330C, and/or automobile computer system 330N may communicate. Cloud computing nodes 300 may communicate with one another. They may be grouped (not shown) physically or virtually, in one or more networks, such as Private, Community, Public, or Hybrid clouds as described hereinabove, or a combination thereof. This allows cloud computing environment 328 to offer infrastructure, platforms and/or software as services for which a cloud consumer does not need to maintain resources on a local computing device. It is understood that the types of computing devices 330A-N shown in FIG. 3B are intended to be illustrative only and that cloud computing nodes 300 and cloud computing environment 328 can communicate with any type of computerized device over any type of network and/or network addressable connection (e.g., using a web browser).

Figure 3C:
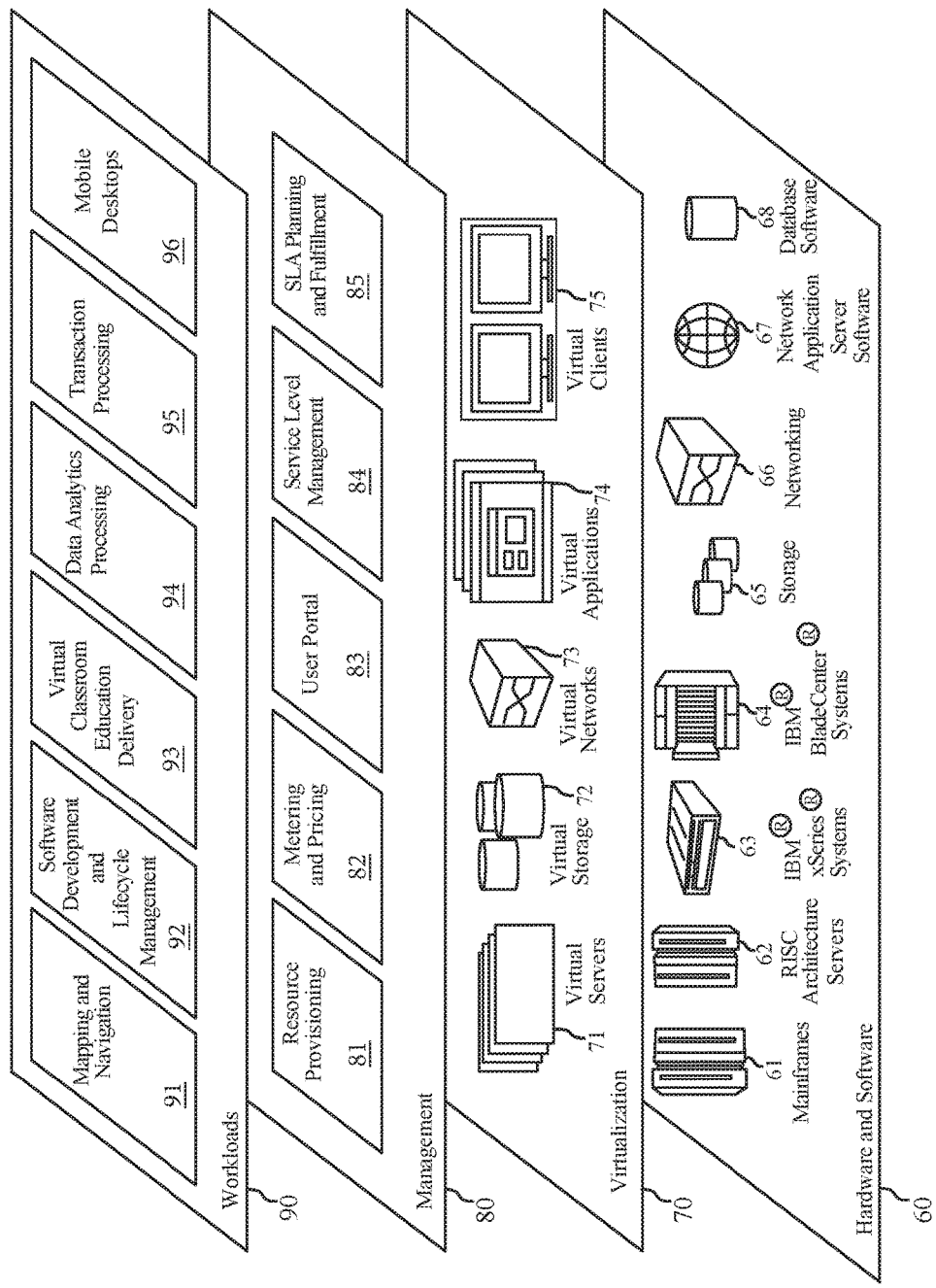
FIG. 3C depicts abstraction model layers according to an embodiment of the present invention.

Referring now to FIG. 3C, a set of functional abstraction layers provided by cloud computing environment 328 (FIG. 3B) is shown. It should be understood in advance that the components, layers, and functions shown in FIG. 3C are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
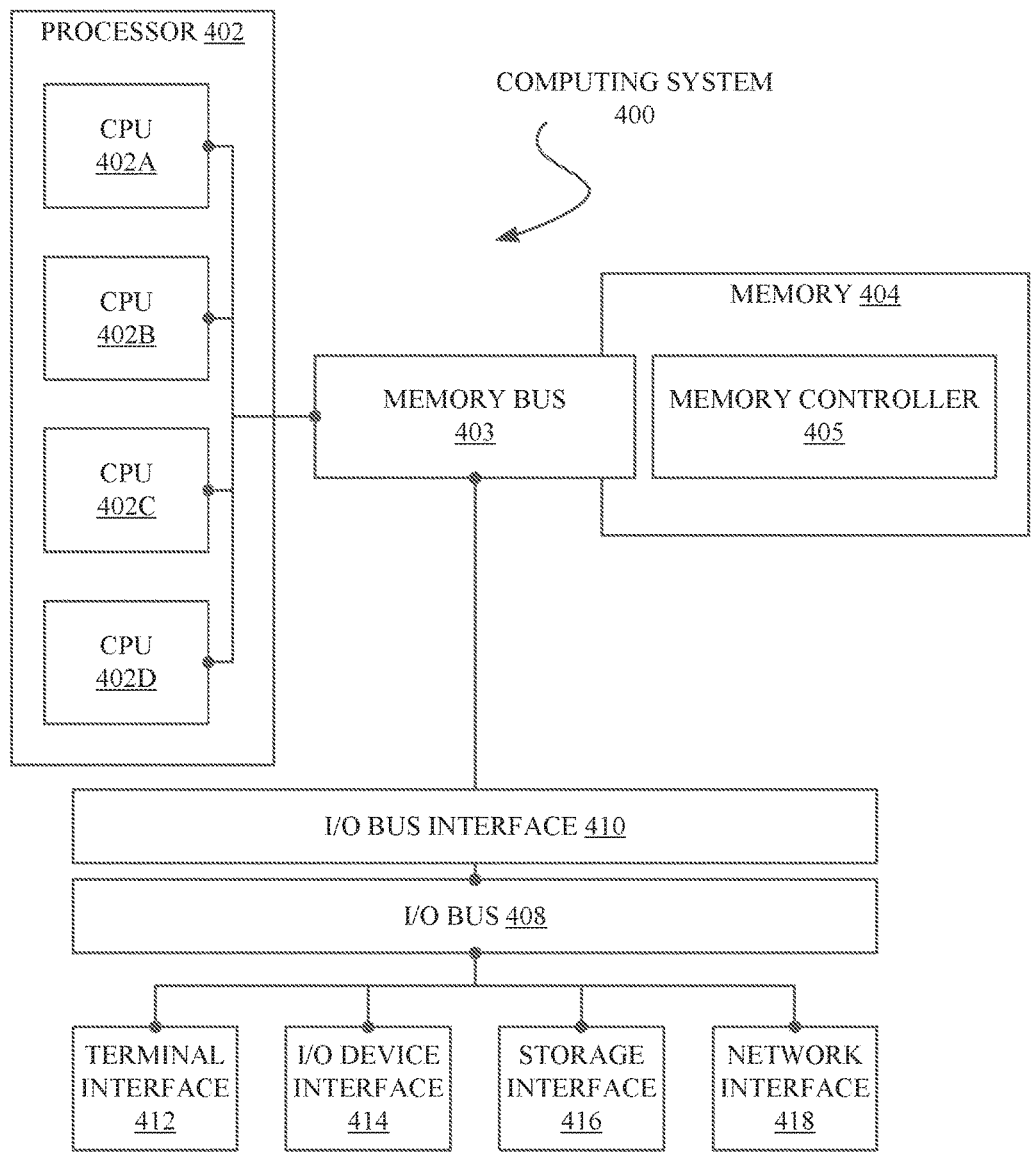
FIG. 4 depicts a high-level block diagram of an example computer system for implementing the methods and modules described herein.

Referring now to FIG. 4, shown is a high-level block diagram of an example computer system (i.e., computer) 400 that may be used in implementing one or more of the methods or modules, and any related functions or operations, described herein (e.g., using one or more processor circuits or computer processors of the computer), in accordance with embodiments of the present disclosure. In some embodiments, the major components of the computer system 400 may comprise one or more CPUs 402, a memory subsystem 404, a terminal interface 412, an I/O (Input/Output) device interface 414, a storage interface 416, and a network interface 418, all of which may be communicatively coupled, directly or indirectly, for inter-component communication via a memory bus 403, an I/O bus 408, and an I/O bus interface unit 410.

The computer system 400 may contain one or more general-purpose programmable central processing units (CPUs) 402A, 402B, 402C, and 402D, herein generically referred to as the CPU 402. In some embodiments, the computer system 400 may contain multiple processors typical of a relatively large system; however, in other embodiments the computer system 400 may alternatively be a single CPU system. Each CPU 402 may execute instructions stored in the memory subsystem 404 and may comprise one or more levels of on-board cache.

In some embodiments, the memory subsystem 404 may comprise a random-access semiconductor memory, storage device, or storage medium (either volatile or non-volatile) for storing data and programs. In some embodiments, the memory subsystem 404 may represent the entire virtual memory of the computer system 400, and may also include the virtual memory of other computer systems coupled to the computer system 400 or connected via a network. The memory subsystem 404 may be conceptually a single monolithic entity, but, in some embodiments, the memory subsystem 404 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 404 may contain elements for control and flow of memory used by the CPU 402. This may include a memory controller 405.

Although the memory bus 403 is shown in FIG. 4 as a single bus structure providing a direct communication path among the CPUs 402, the memory subsystem 404, and the I/O bus interface 410, the memory bus 403 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 400 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 400 may be a multi-user mainframe computer system, a single-user system, or a server computer or similar device that has little or no direct user interface, but receives requests from other computer systems (clients). Further, in some embodiments, the computer system 400 may be implemented as a desktop computer, portable computer, laptop or notebook computer, tablet computer, pocket computer, telephone, smart phone, mobile device, or any other appropriate type of electronic device.

It is noted that FIG. 4 is intended to depict the representative major components of an exemplary computer system 400. In some embodiments, however, individual components may have greater or lesser complexity than as represented in FIG. 4, components other than or in addition to those shown in FIG. 4 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for assigning database objects to a backup storage group, the method comprising:

collecting information related to a plurality of backup devices, wherein the plurality of backup devices includes backup devices representing a plurality of media types and the information includes speed of recovery, time to backup, a media identifier, and a resource indicator;

calculating a recovery rank for each device based on the device's speed of recovery, media identifier, and resource indicator;

defining a backup pool of the plurality of backup devices using a database configuration parameter, wherein a database is to access the backup pool via the database configuration parameter and wherein the database cannot individually access a backup device of the plurality of backup devices;

modifying the database configuration parameter to redefine the backup pool to add a backup device to the plurality of backup devices;

modifying the database configuration parameter to redefine the backup pool to remove a backup device from the plurality of backup devices;

determining to store a backup of a data object in a first device of the plurality of backup devices based on the collected information and a priority rank associated with the data object, the priority rank determined according to the data object's role in database recovery;

detecting a first failure in the first device;

analyzing the first failure in the first device;

identifying a first hardware failure as causing the first failure in the first device;

determining, in response to identifying the hardware failure, to store the backup of the data object in a second device of the plurality of backup devices based on the collected information and the priority rank associated with the data object;

detecting a second failure in the second device;

analyzing the second failure in the second device;

determining the second failure was not caused by a second hardware failure;

reinitiating storing the backup of the data object in the second device; and determining that the backup is complete.

* * * * *